United States Patent [19]
Pearce et al.

[11] Patent Number: 5,651,003
[45] Date of Patent: Jul. 22, 1997

[54] STACKABLE DATA CELL SWITCH ARCHITECTURE

[75] Inventors: Jonathan R. Pearce, Mountain View; P. Kingston Duffie, Palo Alto, both of Calif.

[73] Assignee: Whitetree, Inc., Palo Alto, Calif.

[21] Appl. No.: 476,536

[22] Filed: Jun. 7, 1995

[51] Int. Cl.$^6$ ..................................................... H04L 12/56
[52] U.S. Cl. ........................ 370/395; 370/406; 370/445
[58] Field of Search ..................... 370/85.12, 60.1, 370/85.15, 85.3, 395, 400, 406, 407, 445

[56] References Cited

U.S. PATENT DOCUMENTS

| | | | |
|---|---|---|---|
| 4,922,244 | 5/1990 | Hullett et al. | 340/825.5 |
| 4,926,418 | 5/1990 | Cidon et al. | 370/85.12 |
| 4,973,953 | 11/1990 | Shimokawa et al. | 340/825.05 |
| 5,050,161 | 9/1991 | Golestani | 370/60 |
| 5,126,999 | 6/1992 | Munter et al. | 370/60 |
| 5,224,096 | 6/1993 | Onishi et al. | 370/85.5 |
| 5,241,536 | 8/1993 | Grimble et al. | 370/60.1 |
| 5,278,828 | 1/1994 | Chao | 370/85.6 |
| 5,299,190 | 3/1994 | LaMaire et al. | 370/58.2 |
| 5,303,078 | 4/1994 | Brackett et al. | 359/139 |
| 5,309,435 | 5/1994 | Hirome | 370/85.12 |
| 5,331,636 | 7/1994 | Yang et al. | 370/85.5 |
| 5,432,784 | 7/1995 | Özveren | 370/60.1 |
| 5,469,439 | 11/1995 | Thaler et al. | 370/94.3 |
| 5,477,530 | 12/1995 | Ahmadi et al. | 370/85.12 |
| 5,506,838 | 4/1996 | Flanagan | 370/54 |
| 5,509,001 | 4/1996 | Tachibana et al. | 370/17 |

*Primary Examiner*—Douglas W. Olms
*Assistant Examiner*—Min Jung
*Attorney, Agent, or Firm*—Townsend and Townsend and Crew LLP; Kenneth R. Allen

[57] ABSTRACT

A stackable data cell switch architecture includes a plurality of switch modules coupled in series and forming a bidirectional data transmission loop. Each switch module includes a data cell switch such as an asynchronous transfer mode (ATM) switch, a first transceiver coupled to the data cell switch for receiving data cells from and transmitting data cells to an adjacent switch module in a first transmission direction, and a second transceiver coupled to the data cell switch for receiving data cells from and transmitting data cells to an adjacent switch module in a second transmission direction.

12 Claims, 7 Drawing Sheets

| Cell Sync Bit | Data bits | | | | | | | | Data Words |
|---|---|---|---|---|---|---|---|---|---|
| | 7 | 6 | 5 | 4 | 3 | 2 | 1 | 0 | |
| 1 | Request ID | | | | Flow Control XOFF Mask | | | | 0 |
| 0 | Flow Control XOFF Mask | | | | | | | | 1 |
| 0 | High Priority | Cell | Master | Destination Module Mask | | | | | 2 |
| 0 | Destination Module Mask | | | | | | | | 3 |
| 0 | Call Number | | | | | | | | 4 |
| 0 | Call Number | | | | | | | | 5 |
| 0 | Source Module ID | | | | | | | | 6 |
| 0 | VPC | FC | GFC | | | VPI | | | 7 |
| 0 | VPI | | | | VCI | | | | 8 |
| 0 | VCI | | | | | | | | 9 |
| 0 | VCI | | | | PTI | | | CLP | 10 |
| 0 | HEC | | | | | | | | 11 |
| 0 | ATM Payload | | | | | | | | 12 |
| ... | | | | | | | | | |
| 0 | ATM Payload | | | | | | | | 59 |

STACKABLE DATA CELL SWITCH ARCHITECTURE

BACKGROUND OF THE INVENTION

The present invention relates to an architecture for switching data between individual input and destination resources. More specifically, a bus topology is described herein by which individual data switch modules may be interconnected to provide greater speed, efficiency, and data bandwidth than currently available bus architectures.

Data switch modules which interconnect and switch data between a plurality of input/destination resources, e.g., computer terminals, represent a rapidly developing area of technology. One technique currently employed to implement such data switch modules is known as asynchronous transfer mode (ATM) switching. A building block in an ATM system is a structure known as an ATM switch element. An ATM switch element provides data cell signal routing from one of a plurality of input ports to one or more of a plurality of output ports by maintaining an array of crosspoints for connecting any input port to any output port. ATM switch elements may be aggregated in various patterns to provide an arbitrarily large array of possible interconnections of input ports to output ports, each via a unique path. Such an aggregation of switch elements is typically the basis of a switch module and will be referred to herein generically as an ATM switch.

Figure 1:
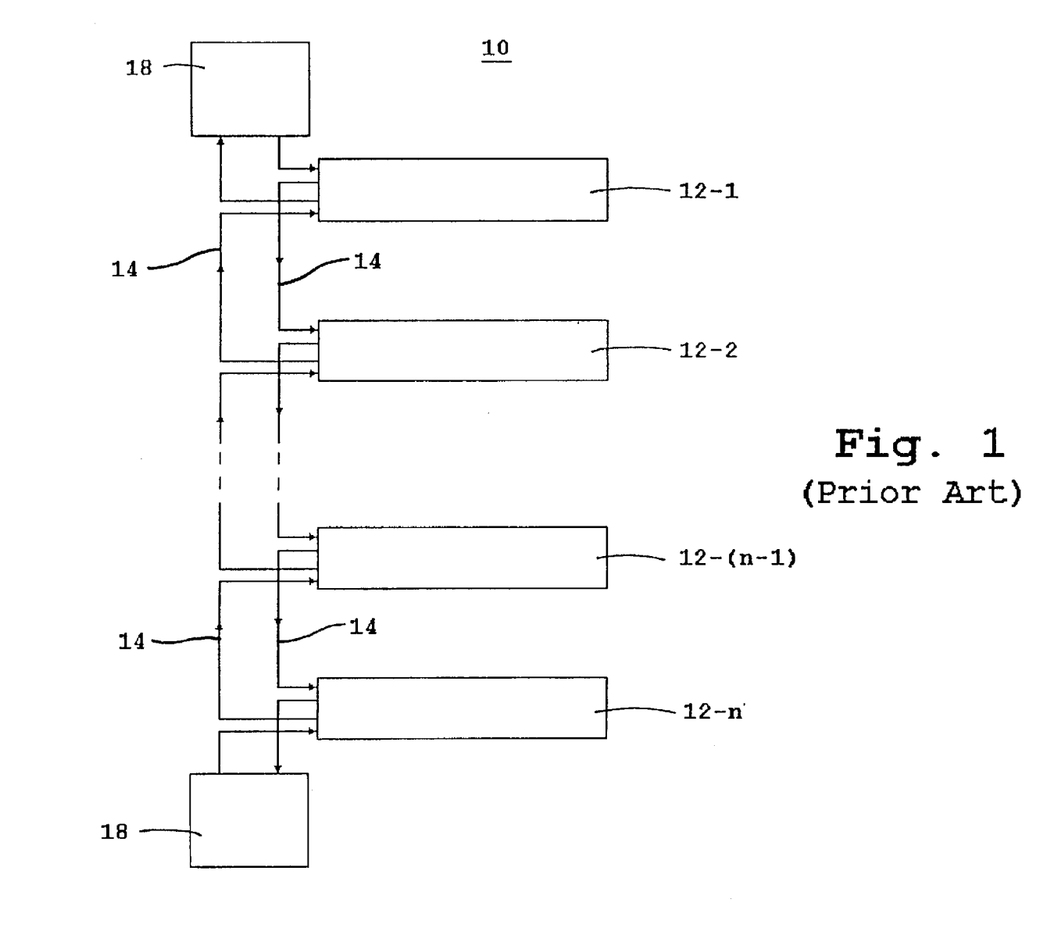
FIG. 1 is a block diagram of a bus topology according to the prior art.

It is also well known that commercially available switch modules, which have a limited fan-out, may be connected together to increase the number of input/destination resources which may be connected. Various bus configurations have provided varying levels of switching performance. FIG. 1 is a block diagram of a typical ATM bus architecture 10 designed according to the prior art. The system shown includes a plurality of ATM switch modules 12 interconnected via unidirectional data bus links 14, and a header bus 18 at each end. Each switch module 12 is connected to some number of input/destination resources such as, for example, computer terminals, for which the switch module 12 provides data switching. Header buses 18 regulate the flow of data in the system.

Problems associated with the bus architecture of FIG. 1 arise when data must be transmitted between two switch modules which are separated by several intervening switch modules. For example, referring again to FIG. 1, if a resource connected to switch module 12-1 communicates with a resource connected to switch module 12-n, data must be transmitted from module 12-1 and pass through modules 12-2 through 12-(n–1) before arriving at module 12-n. As the number of switch modules, n, increases, this method of transmission becomes increasingly less desirable. Not only is the transmission through every switch module time consuming, it also ties up resources thereby consuming precious data bandwidth.

A bus topology for interconnecting data switching modules (such as ATM switch modules) which addresses these concerns is therefore desirable.

SUMMARY OF THE INVENTION

The present invention provides a bus topology for a system which switches and distributes data between input resources and one or more destination resources. The bus topology interconnects a plurality of switch modules, each of which is responsible for switching data among the resources connected to that switch module (including data received from the system bus destined for one or more of its resources), placing data from its resources onto the system bus, and forwarding data received from the system bus to other switch modules on the system bus. The switching in each module is performed by a data switch which may be designed according to any number of technologies including, for example, asynchronous transfer mode (ATM) switching, or ethernet switching. The bus topology of the present invention interconnects the switch modules in series in a dual-ring topology over which data may be circulated bidirectionally. The connections between switch modules are such that the modules may be placed in a stacked configuration without the problems discussed above with reference to FIG. 1, and without any of the interconnection links being substantially longer than any of the other interconnection links. To regulate the flow of data, each data cell distributed by the bus topology of the present invention includes additional overhead for routing, flow control, and cell prioritization. The dual-ring topology has several advantages over the system of FIG. 1. First, because the switch modules are interconnected in a bidirectional ring, the maximum number of "hops" between modules required to transmit a data cell from one switch module to any other switch module is dramatically reduced. Second, because data may be transmitted in either direction around the ring to reach a given switch module, the minimum data bandwidth of the present invention is twice that of a system of the design shown in FIG. 1 having the same data rate.

According to the invention, a stackable data cell switch architecture is described. A plurality of switch modules are disposed in a stack which includes a top switch module and a bottom switch module. Each switch module includes a data cell switch, a first transceiver coupled to the data cell switch for receiving data cells from and transmitting data cells to another switch module, and a second transceiver also coupled to the data cell switch for receiving data cells from and transmitting data cells to still another switch module. The first transceiver of the top switch module is coupled to the first transceiver of the switch module immediately adjacent the top switch module. The second transceiver of the bottom switch module is coupled to the second transceiver of the switch module immediately adjacent the bottom switch module. The first transceiver of each switch module between the switch module immediately adjacent the top switch module and the switch module immediately adjacent the bottom switch module is coupled to the second transceiver of a switch module separated therefrom in a first direction by another switch module. The second transceiver of each switch module disposed between the switch module immediately adjacent the top switch module and the switch module immediately adjacent the bottom switch module is coupled to the first transceiver of a switch module separated therefrom in a second direction by another switch module.

In more specific embodiments, forwarding buffers are coupled between the first transceiver and second transceiver for storing the data cells received by the each transceiver and transmitting the data cells to the other transceiver. Receive buffers are coupled between each of the transceivers and the data cell switch for storing data cells received by the respective transceiver which are destined for the data cell switch. At least one transmit buffer is coupled between the data cell switch and the transceivers for storing data cells transmitted by the data cell switch and transmitting those data cells to the transceivers for transmission to other switch modules.

According to the invention, a method for determining priority between adjacent switch modules for transmitting data cells in the same direction is provided. A priority level for a first data cell stored in a first switch module is compared to a priority level for a second data cell stored in the upstream switch module. The first data cell is transmitted before the second data cell if the priority level of the first data cell is greater than the priority level of the second. The second data cell is transmitted before the first data cell if its priority level is greater than or equal to the priority level of the first data cell.

Also provided is a method for transmitting data cells in the bidirectional data transmission loop which prevents any data cells from endlessly circulating around the loop. A field in each data cell received by a switch module is checked to determine whether the data cell has been previously transmitted previously by that switch module. If not, the first data cell is transmitted to the appropriate resource. If, however, the data cell has been transmitted previously by the that switch module, the data cell is dropped.

Also provided is a method for controlling the flow of data cells between adjacent switch modules in the bidirectional data transmission loop. Data cells are transmitted in a downstream direction from one switch module to the other. The data cells are stored in a buffer in the downstream switch module. Second data cells are transmitted upstream from the downstream switch module, each of which includes a field which corresponds to the number of data cells stored in the buffer in the downstream switch module. The transmission of further data cells from the upstream module to the downstream module is delayed where the field in the second data cells indicates that the number of data cells stored in the buffer exceeds a first number.

A further understanding of the nature and advantages of the present invention may be realized by reference to the remaining portions of the specification and the drawings.

DESCRIPTION OF THE PREFERRED EMBODIMENT

Figure 2:
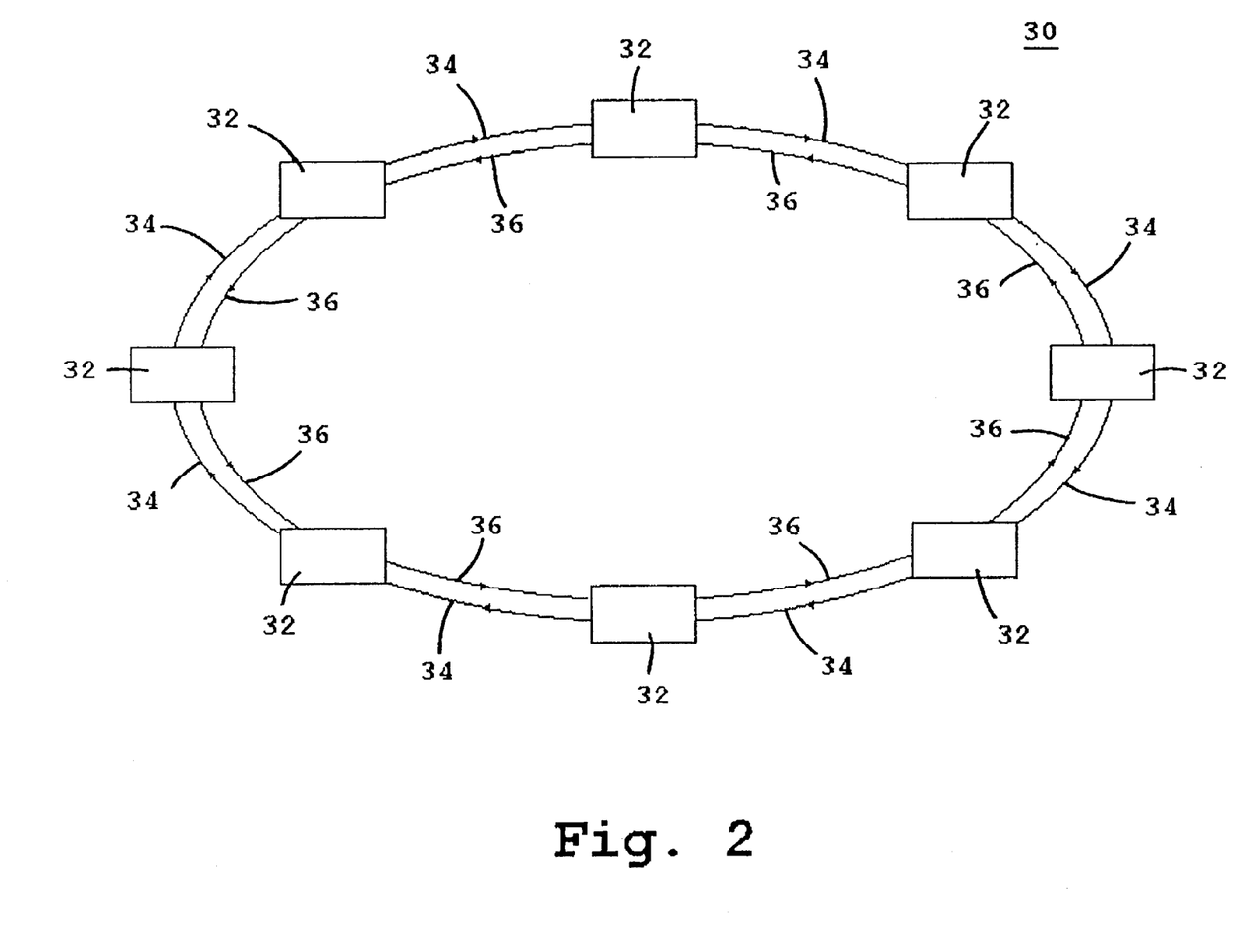
FIG. 2 is a block diagram of a bus architecture designed according to a specific embodiment of the present invention showing a dual-ring topology.

FIG. 2 is a block diagram of a bus architecture 30 designed according to a specific embodiment of the present invention. Eight switch modules 32 are shown interconnected for illustrative purposes. It will be understood that any number of switch modules 32 may be interconnected in this manner. A dual-ring bus topology is realized in which each switch module 32 is connected to each of two adjacent switch modules 32 by two unidirectional data bus links 34 and 36, thereby forming two independent unidirectional rings by which data cells may be transmitted from any one to any other of the switch modules 32. A significant advantage of this bus topology over that shown in FIG. 1 should become apparent upon inspection of FIG. 2. That is, in transmitting data cells according to the bus topology shown in FIG. 2, the maximum number of "hops", i.e., data bus links between adjacent switch modules, required to transmit a data cell between any two switch modules is four rather than seven as in FIG. 1 (i.e., for n=8). Moreover, if for some reason one of the unidirectional data bus links is not operational (thus disabling one of the rings), the system may continue to operate by transmitting data cells via the operational ring in the opposite direction. In such a situation, the first described advantage of the dual-ring topology of the invention is lost. However, the transmission of data cells continues at least as efficiently as the system of FIG. 1.

Another significant advantage with regard to data bandwidth is realized by the dual-ring topology of the present invention. The data bandwidth of a given bus topology is defined by the amount of data which may be transmitted by that bus topology in one second. Referring again to FIG. 1, if each data bus link 14 is capable of transmitting m bits per second, the minimum data bandwidth of the system is 2 m because data may be simultaneously transmitted between any two switch modules 12 via two paths comprising data bus links 14. By contrast, the bus topology shown in FIG. 2 allows data to be transmitted simultaneously between any two switch modules 32 via four paths comprising data bus links 34 and 36, i.e., two data paths in each direction. Thus, if each link has a data bandwidth of m bits per second, the minimum data bandwidth is 4 m, a factor of two better than the topology of FIG. 1. According to a specific embodiment of the present invention, each data bus link has a data bandwidth of 800 megabits per second. Thus, the minimum data bandwidth for this particular embodiment is 3.2 gigabits per second. It will be understood that a wide range of data bandwidths may be realized without departing from the scope of the invention.

Figure 3:
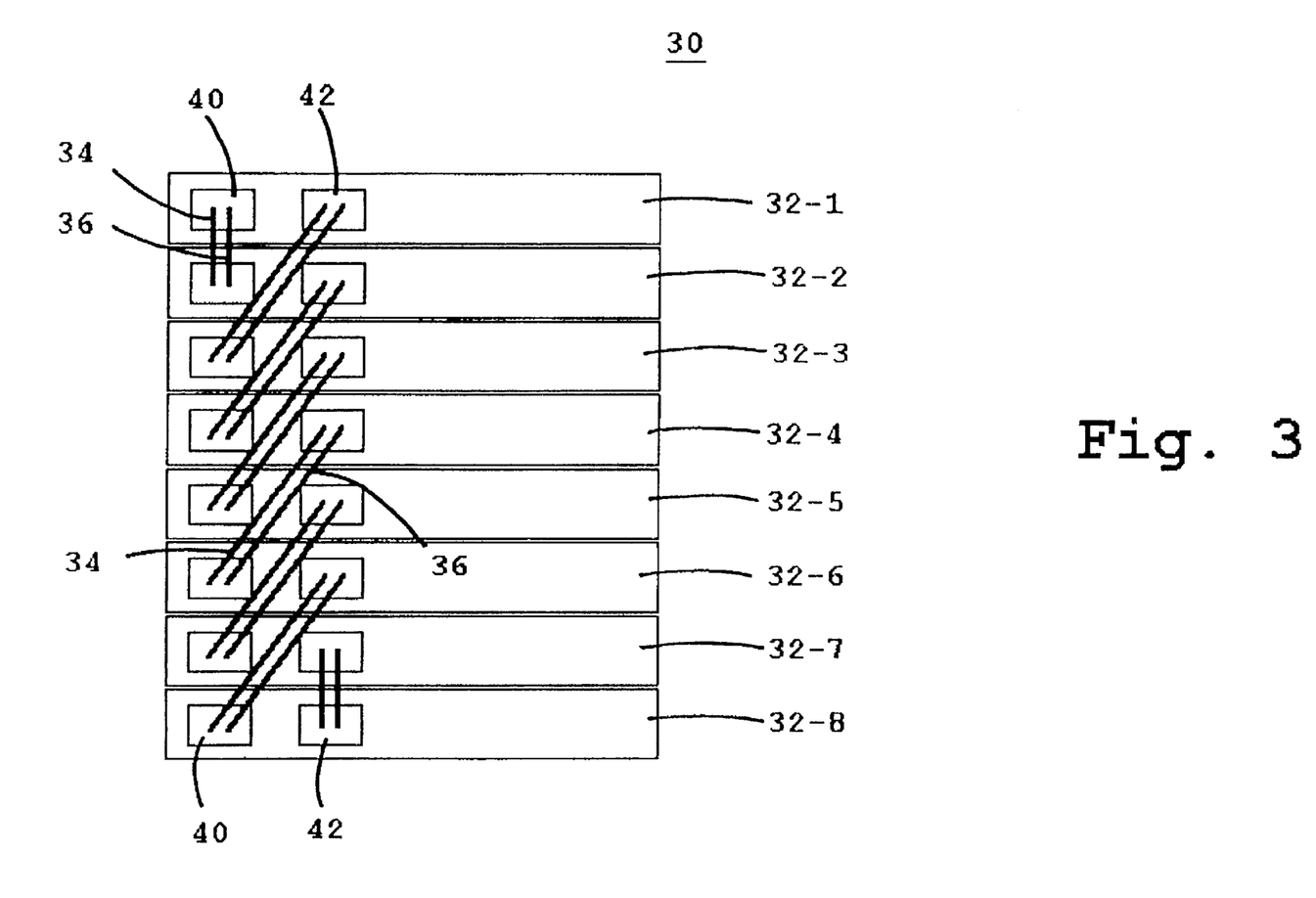
FIG. 3 is a block diagram of a bus architecture designed according to a specific embodiment of the present invention showing a dual-ring topology in a stacking configuration.

FIG. 3 is a block diagram of the dual-ring bus topology of FIG. 2 in a stacking configuration. As in FIG. 2, eight switch modules 32 are shown, but it is understood that more (or fewer) switch modules 32 may be stacked and interconnected in this manner. The way in which switch modules are interconnected allows the stacking of switch modules while still realizing the dual-ring topology of FIG. 2.

Each switch module 32 has first and second transceiver ports 40 and 42, respectively. The first transceiver port 40 of top switch module 32-1 is connected to the first transceiver port 40 of second-from-the-top switch module 32-2 via data bus links 34 and 36. Data cells may be transmitted from switch module 32-1 to 32-2 via data bus link 34, and from switch module 32-2 to 32-1 via data bus link 36. Second transceiver port 42 of switch module 32-1 is connected to first transceiver port 40 of switch module 32-3, second transceiver port 42 of switch module 32-2 is connected to first transceiver port 40 of switch module 32-4, and so on. The second transceiver port of each of switch modules 32-1 through 32-6 is connected to the first transceiver port of a switch module below it in the stack and from which it is separated by one intervening switch module. The second transceiver port 42 of bottom switch module 32-8 is connected to the second transceiver port 42 of second-from-the-bottom switch module 32-7. As described above with respect to switch modules 32-1 and 32-2, each of data bus link 34 and 36 transmit data cells from one switch module 32 to another in one direction.

Figure 4:
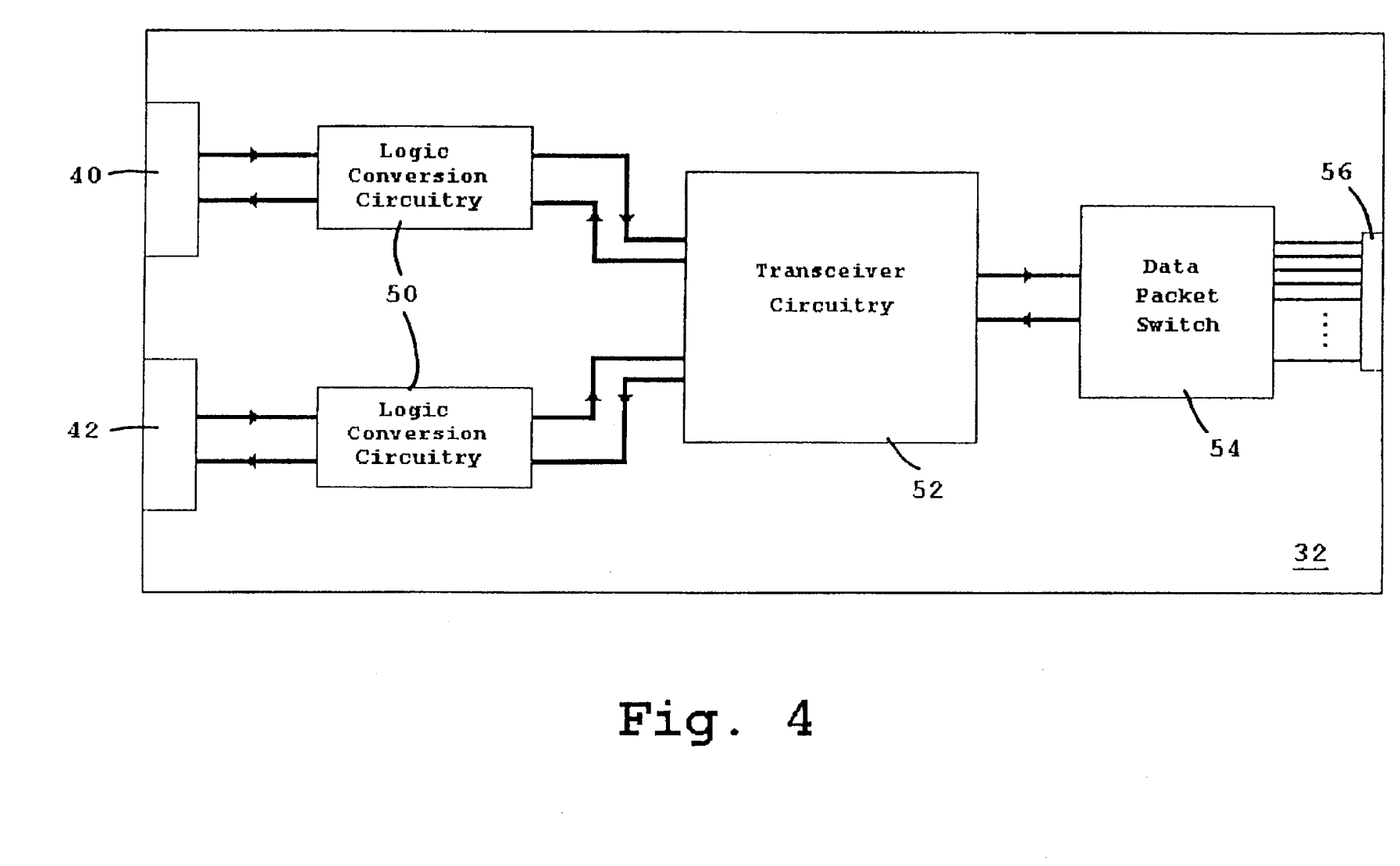
FIG. 4 is a block diagram of a switch module designed according to a specific embodiment of the invention.

FIG. 4 is a block diagram of a switch module 32 designed according to a specific embodiment of the invention. As discussed above, data cells are received and transmitted by switch module 32 via first and second transceiver ports 40 and 42. Each transceiver port has logic conversion circuitry 50 associated therewith for converting CMOS-level signals from transceiver circuitry 52 to ECL-level signals for improved line driving capability. The ECL drivers in conversion circuitry 50 have a line driving capability of up to 25 feet which is more than adequate considering the short interconnection lengths (2–3 inches) made possible by the stacking configuration of FIG. 3.

Logic conversion circuitry 50 also converts the ECL-level signals coming from other switch modules to the CMOS-level signals required by the internal circuitry of switch module 32. Data cell switch 54 receives data cells from input resources via local port 56 and transmits these data cells with appropriate routing information to transceiver circuitry 52. Data cell switch 54 also receives data cells from transceiver circuitry 52 and, according to the routing information contained therein, transmits the data cell to the appropriate destination resource or resources via local port 56. According to one embodiment of the invention, up to twelve input/destination resources may be connected to local port 56. It will be understood, however, that a switch module 32 may be designed to connect to any number of such resources.

Figure 5:
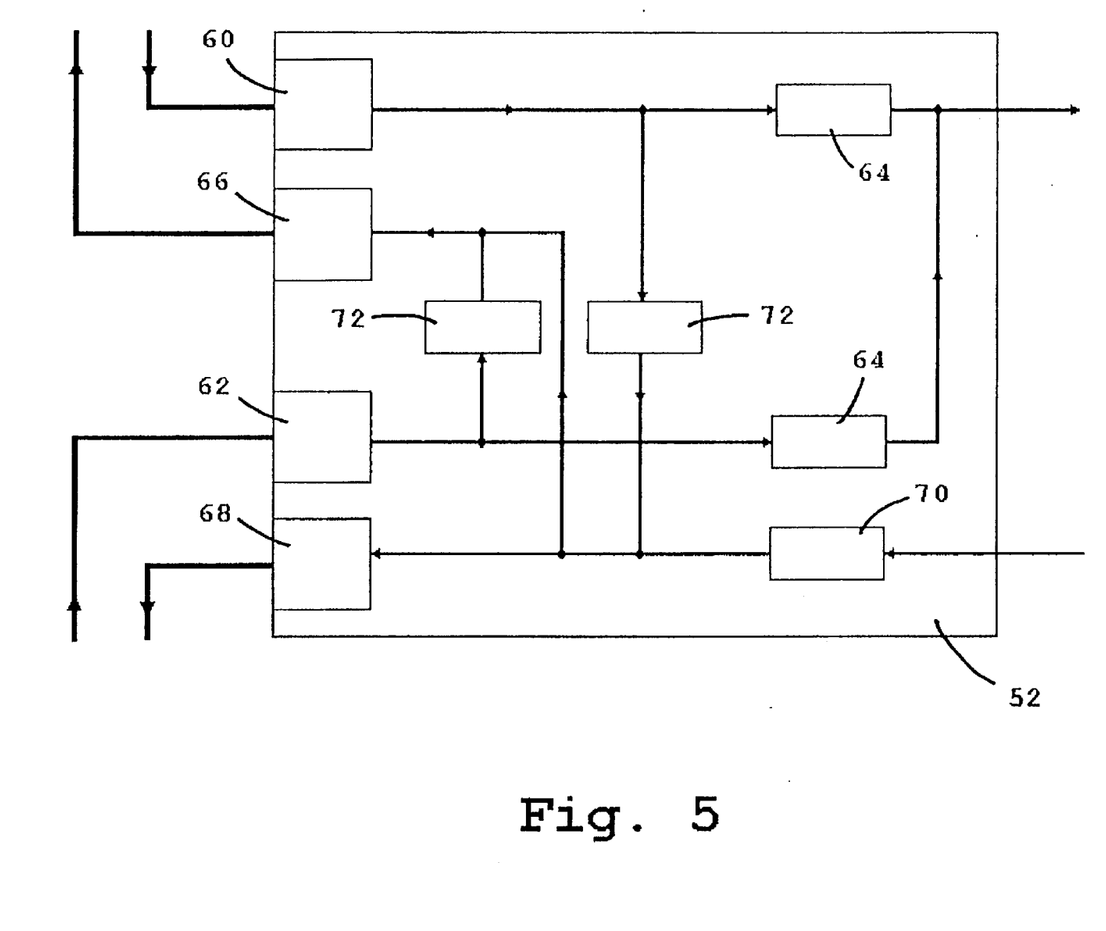
FIG. 5 is a block diagram of transceiver circuitry designed according to a specific embodiment of the invention.

FIG. 5 is a block diagram of transceiver circuitry 52 designed according to a specific embodiment of the invention. Data cells are received from transceiver ports 40 and 42 (FIGS. 3 and 4) by receiver logic 60 and 62, respectively. Each of receiver logic 60 and 62 has a receive buffer 64 associated therewith for storing data cells destined for the particular switch module until they can be accommodated by data cell switch 54 (FIG. 4). According to a specific embodiment, each of receive buffers 64 can accommodate up to 32 data cells.

Data cells are transmitted by transceiver circuitry 52 via transmitter logic 66 and 68 which are connected (via logic conversion circuitry 50) to first and second transceiver ports 40 and 42, respectively. Transmitter logic 66 and 68 are both connected to a transmit buffer 70 which stores data cells transmitted by data cell switch 54 until they may be transmitted by the appropriate transmitter logic to other switch modules. According to a specific embodiment, transmit buffer 70 can accommodate 4 data cells.

Forwarding buffers 72 are connected between the receiver logic of each transceiver port and the transmitter logic of the opposing transceiver port. These forwarding buffers 72 store data cells received from other switch modules which are not destined for the particular switch module 32 so that they may be transmitted to the corresponding transmitter logic for transmission to one or more of the other switch modules. In a specific embodiment, forwarding buffers 72 can accommodate 4 data cells. It will be understood that the storage capacities of the receive, transmit, and forwarding buffers may vary without departing from the scope of the invention. It will also be understood that each transmitter logic 66 and 68 may have its own transmit buffer 70 rather than having only one shared buffer.

Some data switching protocols associated with the architecture of FIGS. 2–5 will now be described. These protocols will be discussed with regard to the environment of asynchronous transfer mode (ATM) switching. However, it will be understood that the principles of the invention as described thus far may be applied to other types of data switching schemes such as, for example, that employed by ethernet switching systems.

Figure 6:
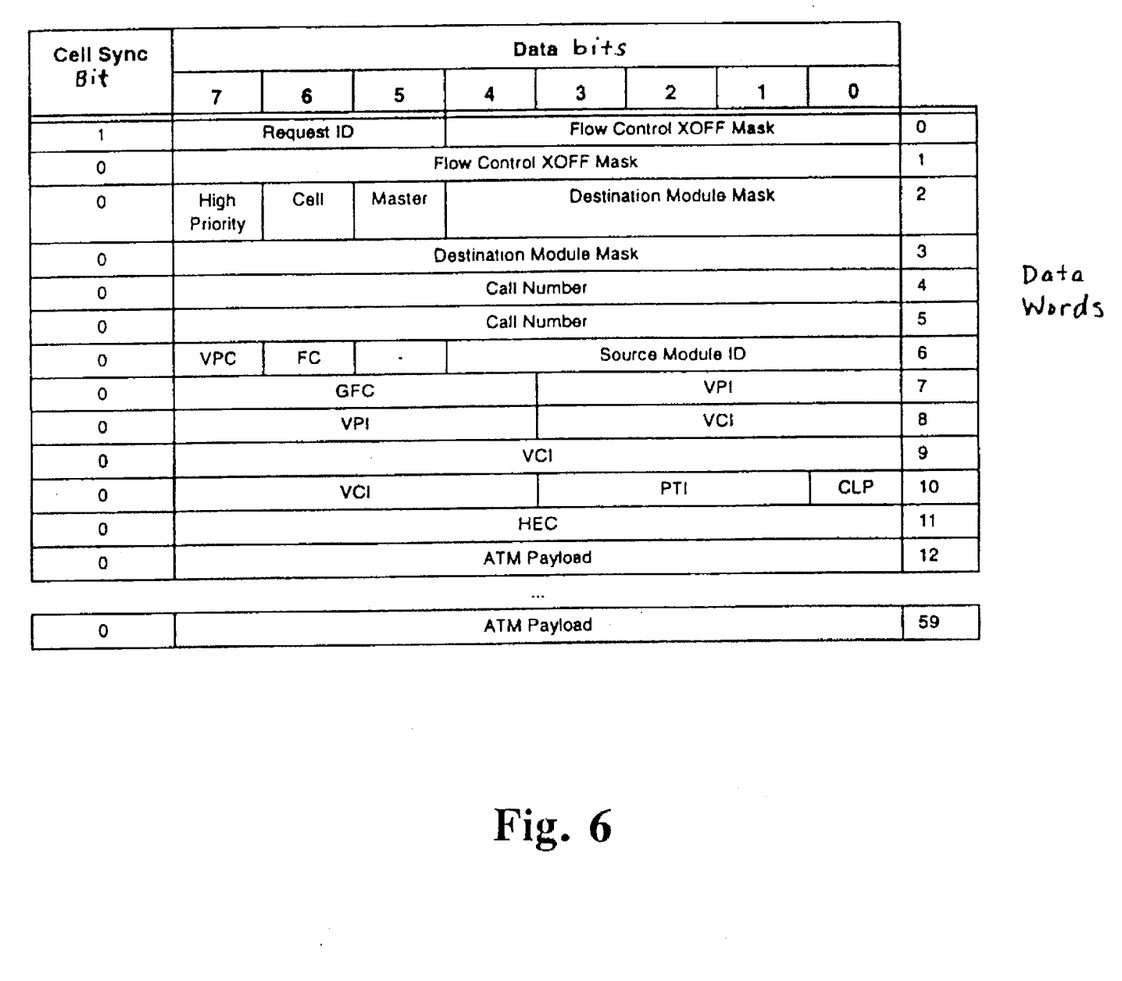
FIG. 6 is a table which describes the format of data cells according to a specific embodiment of the present invention.

According to a specific ATM embodiment of the present invention, each data bus link (34 and 36) comprises ten differential ECL signals (eight data bits, 1 start of cell bit, and a clock signal). Each data cell distributed by the invention includes an overhead field which includes an ATM header and a stacking header which identifies, among other things, the source module from which the data cell originated, the destination module to which the data cell is being transmitted, the priority of the data cell, and various other information which may be employed in controlling the flow of data cells in the dual-ring system. The ATM cell format according to a specific embodiment of the invention is shown in the table of FIG. 6.

Each data cell comprises sixty 8-bit data words each of which has a cell sync bit associated therewith which is used to indicate the beginning of the data cell. The first seven words (0–6) make up the stacking header of the cell. The next five words (7–11) make up the ATM header, the purpose of which is to provide routing information to the ATM switches. Words 12–59 make up the data portion of the data cell also known as the ATM payload. The stacking header contains several fields, some of the uses of which are discussed below. Additionally, each switch module has associated therewith a static extract mask and a module identification field.

Figure 7:
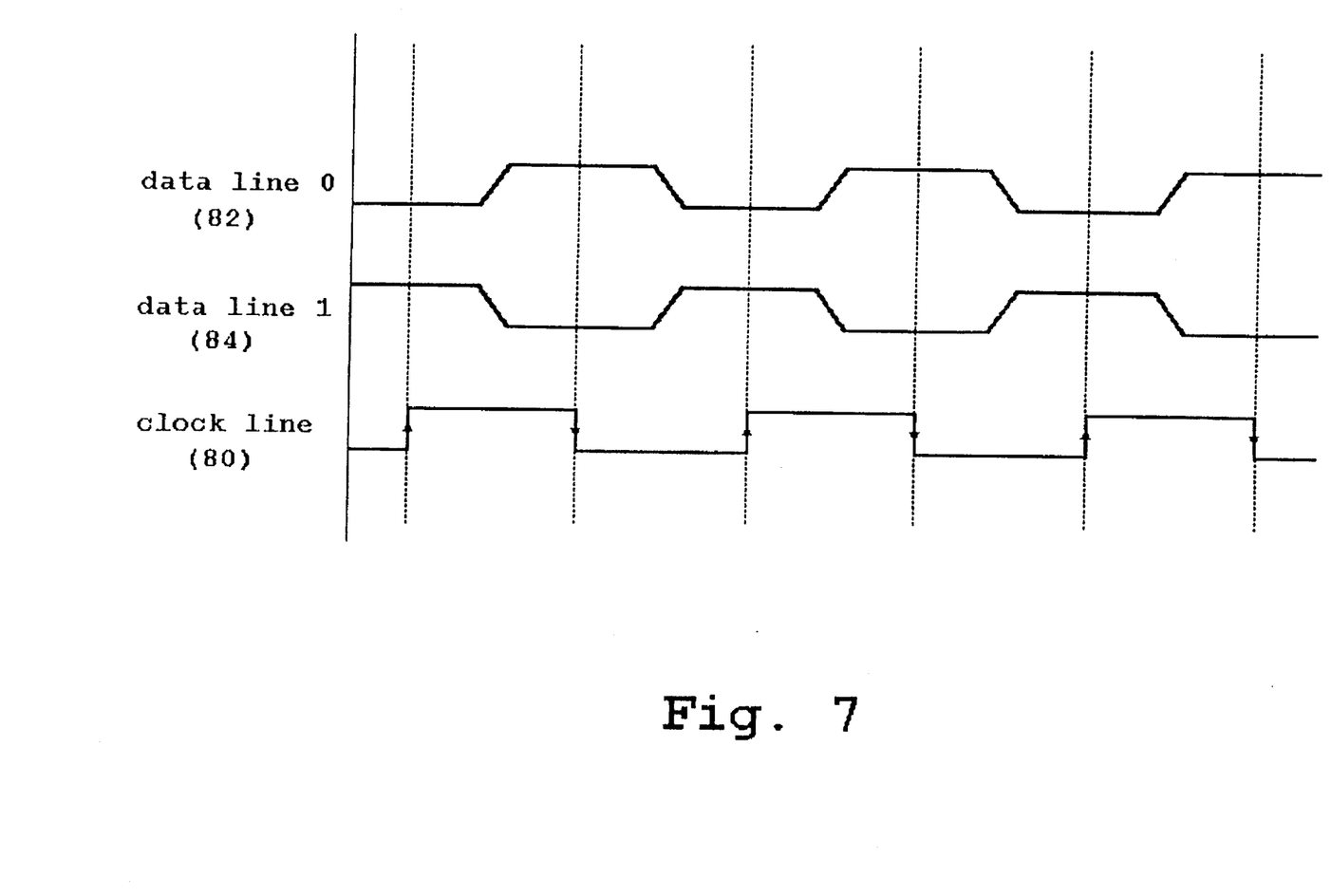
FIG. 7 is a timing diagram comparing data cycles to the system clock according to a specific embodiment of the invention.

In a specific embodiment of the invention, data are clocked on both the rising and falling edge of the system clock pulse. FIG. 7 is a timing diagram comparing data cycles to the system clock according to this embodiment. Each transition of clock signal 80 clocks data 82 and 84 from data lines 0 and 1, respectively. This data clocking scheme effectively doubles the actual clock rate of the system. In one embodiment, the actual clock rate of 50 MHz is doubled in this manner to an effective clock rate of 100 MHz. The use of a lower clock frequency to achieve a higher effective clock rate results in a lesser susceptibility to electromagnetic interference (EMI).

When a data cell is received by a particular switch module, the destination module mask (or routing label) in the stacking overhead is ANDed with the static extract mask of the switch module. If the result of the AND operation is nonzero, the cell is written to the receive buffer as long as the receive buffer is not full. The destination module mask is also ANDed with the complement of the static extract mask. If this result is nonzero and the source module field is not equal to the module identification field, the cell is written to the forwarding buffer (unless full) with a modified destination module mask which is the result of the original destination module mask ANDed with the complement of the module's static extract mask.

When a cell is to be transmitted in a first direction by a particular switch module, its priority field is used to populate a request identification field in data cells being transmitted in the direction opposite the first direction (i.e., upstream). This priority field data may be employed by the upstream switch module to regulate the transmission of other data cells. For example, the upstream switch module may employ the priority information to delay the transmission of lower priority data cells. The request identification field in data cells traveling upstream is set to its maximum value when the forwarding buffer in the switch module has more than a some number of data cells stored therein, i.e., it has exceeded its so called "high water mark". This indicates to the upstream switch module that it should temporarily delay transmission of further data cells to the switch module.

If the number of data cells in one of the receive buffers in a particular switch module exceeds the high water mark of the receive buffer the static extract mask of that switch module is ORed with a flow control mask in data cells traveling upstream as an indication to the upstream switch module that the high water mark has been exceeded. If the high water mark of the receive buffer has not been exceeded, the flow control mask is ANDed with the complement of the static extract mask. The upstream switch module employs this information to regulate the transmission of data cells downstream.

A switch module only transmits a data cell stored in its transmit buffer if the priority field of the data cell to be transmitted indicates a priority which is greater than or equal to the priority of a cell to be transmitted by the downstream switch module (as indicated by the request identification field of data cells moving upstream), the result of the downstream flow control mask ANDed with the destination module mask is zero, and there are no data cells in the forwarding buffer of the downstream switch module. As discussed above, a switch module will not transmit data cells from its own forwarding buffer if the request identification field of data cells transmitted from the downstream switch module is set to its maximum value.

This "backpressure handshake" feature of the present invention addresses a problem which may be encountered because of clock speed differentials. The clock employed by the receiver logic of each switch module is synchronized with the clock employed by the transmitter logic of the previous switch module. Thus, the receiver logic of a switch module's first transceiver port employs a different clock than the transmitter logic of the module's second transceiver port. If the clock for the receiver logic is faster than the clock for the transmitter logic, there is a potential for data cells to be coming into the associated forwarding buffer faster than they are transmitted. The application of backpressure as described above avoids this situation whether caused by clock skew or other data flow considerations.

According to a specific embodiment of the invention, a switch module assumes it has satisfied a downstream switch module's request identification condition (e.g., forwarding buffer full or higher priority cell) by transmitting an empty data cell slot. The switch module can then populate the request identification field of data cell received from the downstream switch module with the priority field from the data cell it is waiting to transmit, and then forward the data cell from the downstream switch module to the upstream switch module. If the switch module has no data cells waiting to be transmitted, it forces the request identification field of the data cell from the downstream switch module to zero before forwarding it to the upstream switch module.

An additional safeguard is provided to prevent data cells from endlessly circulating on the dual-ring bus. Such a condition might occur if one switch module attempted to transmit a data cell to a switch module which was no longer connected in the loop. The primary mechanism to achieve this stability is the designation of one of the switch modules as the master switch module. A master bit in the stacking header of each data cell is set when that data cell is transmitted by the master switch module. When the master switch module encounters a data cell in which the master bit has been set, that data cell is removed from the bus and dropped. However, because at system start-up the designation of the master switch module has not yet occurred, a secondary stability mechanism is provided. Start-up stability is achieved using the source module field. If the source module field indicates that the data cell originated from a particular switch module, and the data cell gets back to that switch module, it is removed from the bus and dropped.

While the invention has been particularly shown and described with reference to a specific embodiment thereof, it will be understood by those skilled in the art that the foregoing and other changes in the form and details may be made therein without departing from the spirit or scope of the invention.

What is claimed is:

1. A stackable data cell switch architecture, comprising:
a plurality of switch modules disposed in a stack including a top switch module and a bottom switch module, each switch module comprising:
a data cell switch;
a first transceiver coupled to the data cell switch for receiving data cells from and transmitting data cells to a first switch module; and
a second transceiver coupled to the data cell switch for receiving data cells from and transmitting data cells to a second switch module;
wherein the first transceiver of the top switch module is coupled to the first transceiver of a switch module immediately adjacent the top switch module, and the second transceiver of the bottom switch module is coupled to the second transceiver of a switch module immediately adjacent the bottom switch module, and where there are additional switch modules disposed between the switch module immediately adjacent the top switch module and the switch module immediately adjacent the bottom switch module, the first transceiver of each additional switch module is coupled to the second transceiver of a switch module separated from the additional switch module in a first direction by one of the switch modules, and the second transceiver of each additional switch module is coupled to the first transceiver of a switch module separated from the additional switch module in a second direction by another one of the switch modules.

2. The architecture of claim 1 wherein, for each switch module, the first transceiver is coupled to the second transceiver, first and second data cells received by the first and second transceivers, respectively, which are not destined for the data cell switch coupled thereto being transmitted to the second and first transceivers, respectively, for transmission to other switch modules.

3. The architecture of claim 2 wherein each switch module further comprises:
a first forwarding buffer coupled between the first transceiver and second transceiver for storing the first data cells received by the first transceiver and transmitting the first data cells to the second transceiver; and
a second forwarding buffer coupled between the first transceiver and second transceiver for storing the second data cells received by the second transceiver and transmitting the second data cells to the first transceiver.

4. The architecture of claim 1 wherein each switch module further comprises:
a first receive buffer coupled between the first transceiver and the data cell switch for storing first data cells received by the first transceiver which are destined for the data cell switch coupled thereto; and
a second receive buffer coupled between the second transceiver and the data cell switch for storing second data cells received by the second transceiver which are destined for the data cell switch coupled thereto.

5. The architecture of claim 1 further comprising at least one transmit buffer coupled between the data cell switch and the first and second transceivers for storing first data cells transmitted by the data cell switch and transmitting the first data cells to the first and second transceivers for transmission to the first and second switch modules.

6. The architecture of claim 1 wherein the first and second transceivers of each switch module are coupled to the first and second transceivers of other switch modules via bidirectional connections.

7. The architecture of claim 6 wherein each of the bidirectional connections comprises two transmission lines, each of which transmits data cells in one direction.

8. The architecture of claim 1 wherein each data cell switch comprises an asynchronous transfer mode (ATM) switch.

9. The architecture of claim 1 wherein each data cell switch comprises an ethernet switch.

10. The architecture of claim 1 wherein the first transceiver comprises first transmitter logic and first receiver logic for receiving first data cells, and wherein the second transceiver comprises second transmitter logic and; second receiver logic for receiving second data cells, each switch module further comprising:

a first forwarding buffer coupled between the first receiver logic and the second transmitter logic for storing selected first data cells and transmitting the selected first data cells to the second transmitter logic for transmission;

a second forwarding buffer coupled between the second receiver logic and the first transmitter logic for storing selected second data cells and transmitting the selected second data cells to the first transmitter logic for transmission;

a first receive buffer coupled to the first receiver logic for storing other selected first data cells;

a second receive buffer coupled to the second receiver for storing other selected second data cells; and at least one transmit buffer coupled to the first and second transmitter logic for storing third data cells and transmitting the third data cells to the first and second transmitter logic.

11. The architecture of claim 10 wherein the first and second receiver logic, the first and second transmitter logic, the first and second receive buffers, the first and second forwarding buffers, and the at least one transmit buffer are included in a single integrated circuit.

12. The architecture of claim 1 wherein the plurality of switch modules are coupled in series thereby forming a bidirectional data transmission loop.

* * * * *